US011216652B1

(12) United States Patent
Tao et al.

(10) Patent No.: US 11,216,652 B1
(45) Date of Patent: Jan. 4, 2022

(54) EXPRESSION RECOGNITION METHOD UNDER NATURAL SCENE

(71) Applicant: INSTITUTE OF AUTOMATION, CHINESE ACADEMY OF SCIENCES, Beijing (CN)

(72) Inventors: Jianhua Tao, Beijing (CN); Mingyuan Xiao, Beijing (CN); Bin Liu, Beijing (CN); Zheng Lian, Beijing (CN)

(73) Assignee: INSTITUTE OF AUTOMATION, CHINESE ACADEMY OF SCIENCES, Beijing (CN)

( * ) Notice: Subject to any disclaimer, the term of this patent is extended or adjusted under 35 U.S.C. 154(b) by 0 days.

(21) Appl. No.: 17/470,135

(22) Filed: Sep. 9, 2021

(30) Foreign Application Priority Data

Mar. 1, 2021 (CN) .......................... 202110222926.5

(51) Int. Cl.
*G06K 9/62* (2006.01)
*G06K 9/00* (2006.01)
(Continued)

(52) U.S. Cl.
CPC ..... *G06K 9/00302* (2013.01); *G06K 9/00228* (2013.01); *G06K 9/00281* (2013.01);
(Continued)

(58) Field of Classification Search
None
See application file for complete search history.

(56) References Cited

U.S. PATENT DOCUMENTS 9,600,711 B2 * 3/2017 Shreve ............... G06K 9/00771
9,666,088 B2 * 5/2017 Dalal ....................... G09B 5/02
(Continued)

FOREIGN PATENT DOCUMENTS

CN 108491764 A 9/2018
CN 109145837 A 1/2019
(Continued)

OTHER PUBLICATIONS

Li et al., "Deep representation of facial geometric and photometric attributes for automatic 3d facial expression recognition." arXiv preprint arXiv:1511.03015 (2015). (Year: 2015).*
(Continued)

*Primary Examiner* — Feng Niu
(74) *Attorney, Agent, or Firm* — Westbridge IP LLC (57) ABSTRACT

An expression recognition method under a natural scene comprises: converting an input video into a video frame sequence in terms of a specified frame rate, and performing facial expression labeling on the video frame sequence to obtain a video frame labeled sequence; removing natural light impact, non-face areas, and head posture impact elimination on facial expression from the video frame labeled sequence to obtain an expression video frame sequence; augmenting the expression video frame sequence to obtain a video preprocessed frame sequence; from the video preprocessed frame sequence, extracting HOG features that characterize facial appearance and shape features, extracting second-order features that describe a face creasing degree, and extracting facial pixel-level deep neural network features by using a deep neural network; then, performing vector fusion on these three obtain facial feature fusion vectors for training; and inputting the facial feature fusion vectors into a support vector machine for expression classification.

6 Claims, 4 Drawing Sheets

(51) Int. Cl.
*G06T 5/00* (2006.01)
*G06T 5/40* (2006.01)
*G06K 9/46* (2006.01)
*G06N 3/04* (2006.01)

(52) U.S. Cl.
CPC ..... *G06K 9/00718* (2013.01); *G06K 9/00744* (2013.01); *G06K 9/00765* (2013.01); *G06K 9/4647* (2013.01); *G06K 9/629* (2013.01); *G06K 9/6256* (2013.01); *G06K 9/6269* (2013.01); *G06N 3/04* (2013.01); *G06T 5/009* (2013.01); *G06T 5/40* (2013.01); *G06T 2207/10016* (2013.01); *G06T 2207/30201* (2013.01)

(56) References Cited

U.S. PATENT DOCUMENTS

| | | | | |
|---|---|---|---|---|
| 10,325,181 | B2* | 6/2019 | Xu | G06N 3/084 |
| 10,571,934 | B2* | 2/2020 | Tian | G05D 1/12 |
| 10,650,508 | B2* | 5/2020 | Chang | G06K 9/66 |
| 10,789,456 | B2* | 9/2020 | Luo | G06N 3/0454 |
| 10,835,167 | B2* | 11/2020 | Voss | G16H 50/30 |
| 11,089,985 | B2* | 8/2021 | Voss | G06K 9/00302 |
| 2004/0175021 | A1 | 9/2004 | Porter et al. | |
| 2010/0296706 | A1* | 11/2010 | Kaneda | G06K 9/48 |
| | | | | 382/118 |
| 2014/0063236 | A1* | 3/2014 | Shreve | G06K 9/00228 |
| | | | | 348/143 |
| 2018/0089803 | A1 | 3/2018 | Zhang et al. | |
| 2019/0042895 | A1* | 2/2019 | Liang | G06K 9/00288 |
| 2021/0312206 | A1* | 10/2021 | Meidar | G06N 3/02 |

FOREIGN PATENT DOCUMENTS

| | | | |
|---|---|---|---|
| CN | 109635727 | A | 4/2019 |
| CN | 110210429 | A | 9/2019 |
| CN | 110598587 | A * | 12/2019 |
| CN | 111310798 | A * | 6/2020 |
| CN | 111401105 | A | 7/2020 |
| CN | 107273845 | B * | 10/2020 |

OTHER PUBLICATIONS

Hu et al., "Natural Scene Facial Expression Recognition based on Differential Features." In 2019 Chinese Automation Congress (CAC), pp. 2840-2844. IEEE, 2019. (Year: 2019).*

Porcu et al., "Evaluation of Data Augmentation Techniques for Facial Expression Recognition Systems." Electronics 9, No. 11 (2020): 1892. (Year: 2020).*

First Office Action issued in counterpart Chinese Patent Application No. 202110222926.5, dated Apr. 9, 2021.

* cited by examiner

EXPRESSION RECOGNITION METHOD UNDER NATURAL SCENE

CROSS-REFERENCE TO RELATED APPLICATIONS

The present disclosure claims priority to Chinese Patent Application CN202110222926.5 entitled "Expression recognition method and device under natural scene" filed on Mar. 1, 2021, the entire content of which is incorporated herein by reference.

FIELD OF THE INVENTION

This disclosure relates to the field of video image processing, and in particular to an expression recognition method and an expression recognition device under a natural scene.

BACKGROUND OF THE INVENTION

Artificial Intelligence (AI) is a kind of theory, method, technology and application system that utilize a computer or a computer-controlled machine to simulate, extend and expand human intelligence, perceive environment, acquire knowledge, and use knowledge to obtain the best outcome.

Computer Vision (CV) refers to performing machine-visual identification, tracking, and measurement on a target with a camera and a computer instead of human eyes, and further performing graphic processing so that images processed by the computer become into the ones that are more suitable to be observed by human eyes or to be transmitted to an instrument for detection. As a scientific discipline, computer vision studies on related theories and technologies and attempts to establish an artificial intelligence system that can obtain information from images or multi-dimensional data. Computer vision technology generally includes image processing, image recognition, image semantic comprehension, image retrieval, OCR, video processing, video semantic comprehension, video content/behavior recognition, three-dimensional object reconstruction, 3D technology, virtual reality, augmented reality, synchronous positioning and mapping construction and other technologies, and it further includes some common biometric recognition technologies like face recognition, fingerprint recognition, and the like.

Machine Learning (ML) is a common research hotspot in the fields of artificial intelligence and pattern recognition, and its theory and methodology have been widely applied to solve complicated problems in engineering applications and science fields.

Deep Learning (DL) is a new research direction of the field of machine learning, which is introduced into machine learning to get closer to its original goal—artificial intelligence. Deep learning is to learn inherent law and representation levels of sample data. Information obtained during this learning helps a lot for interpretation of data, such as text, images and sounds. An ultimate goal of DL is to enable machines to have an ability of analyzing and learning and to recognize data such as text, images and sounds, just like human beings. Deep learning is a complex machine learning algorithm, by which achieved outcomes in speech and image recognition has surpassed the prior related technologies much further.

Emotion computing is a highly comprehensive research and technical field, which employs computational science in conjunction with psychological science and cognitive science to carry out study of emotional characteristics during human-human interaction and human-computer interaction, and to carry out design of a human-computer interaction environment enabling emotional feedback so that it is possible to realize human-computer emotional interaction. Research of emotion computing will increasingly deepen comprehension on human emotional states and mechanisms, and improves harmony between human and computer interfaces, that is, improving capabilities of computers to perceive situations, comprehend human emotions and intentions, and respond appropriately.

Emotion is a crucial component of human-human interaction and human-computer interaction systems. Emotional information may be conveyed in different forms, such as facial expression, speech intonation, peripheral physiological signal, brain electrical signal, and even text content. Facial expression is the most powerful and natural channel of humans to express their emotional states and intentions, because data from facial expression is easier to be collected and labeled relative to data from other channels; more than 55% of human emotions and intentions are delivered through facial expressions; facial expression recognition has a wide range of application demand in many fields, such as chat robot, intelligent medical care, fatigue monitoring, and polygraph analysis.

Since the year of 2013, due to substantial improvement of chip processing capability (such as a GPU unit) and rapid development of machine learning technology, expression recognition has gradually leaped from traditional machine learning methods to deep learning methods, and improvement of algorithms and computing power has unceasingly brought about breakthroughs in performance of expression recognition systems. However, on the one hand, in a natural scene, since interference such as light irradiation, head posture change, and face occlusion are inevitable, there is always a problem of low accuracy of recognition.

On the other hand, according to varied representing patterns of features, facial expression recognition systems can be divided into two types, i.e., static image facial expression recognition and dynamic sequence facial expression recognition. In a method of static, an expression recognition system only extracts spatial feature information of a current single image for encoding. Rather, a method of dynamic, temporal relationship between neighboring frames among multiple images is taken into account. Expression recognition in a laboratory environment focuses more on static expression analysis, while in the case of a natural scene major focus is on expression clue in a video stream. How to integrate with time-series context information to improve performance of expression recognition under a natural scene is a key issue to be solved urgently.

Patent No. CN108491764B provides a video face emotion recognition method, medium and device. The method includes: acquiring a video within a specified time period; and identifying emotion of at least one to-be-detected face image in the video according to content context information and facial expression information in the video. By acquiring the video within the specified time period, and according to the content context information and the facial expression information in the video, the emotion of at least one to-be-detected image in the video is identified. This solution simultaneously considers both the content scene of a scene in the video and the facial expression to recognize the emotion, so that robustness and accuracy of the emotion recognition can be improved.

Patent Application Publication No. CN109145837A discloses a face emotion recognition method, device, terminal device and storage medium. The method includes steps of:

obtaining a current data frame in a video stream, capturing a face from the current data frame, and extracting feature information of the face; according to the extracted facial feature information, subjecting the feature information to a pre-trained expression classification model to classify a facial expression; sending a classification result of the facial expression to an associative robot so that the associative robot can feedback the classification result of the facial expression in the form of speech. This solution precisely locates specific positions of feature points, and then recognizes classification results of different facial expressions.

SUMMARY OF THE INVENTION

The present disclosure provides an expression recognition method under a natural scene, including step of:

S1, data segmentation step, in which an input video is converted into a video frame sequence in terms of a specified frame rate, and the video frame sequence is subject to facial expression labeling to obtain a video frame labeled sequence;

S2, video frame labeled sequence preprocessing step, in which the video frame labeled sequence is subject to light irradiation impact elimination, non-face area removing, and head posture impact elimination on facial expression so as to obtain an expression video frame sequence, and then the expression video frame sequence is augmented to obtain a video preprocessed frame sequence, wherein the light irradiation impact elimination includes adopting a brightness preservation dynamic histogram equalization method to eliminate an impact of light irradiation from the video frame labeled sequence so as to obtain a video frame de-lighting sequence;

S3, video preprocessed frame sequence feature extraction step, in which, from the video preprocessed frame sequence, histogram of orientated gradient (HOG) features that characterize facial appearance and shape features are extracted, second-order features that describe a face creasing degree are extracted, and facial pixel-level deep neural network features are extracted by using a deep neural network;

S4, performing alignment processing and then vector fusion on the HOG features, the second-order features that describe the face creasing degree, and the pixel-level deep neural network features so as to obtain facial feature fusion vectors for training; and S5, inputting the facial feature fusion vectors into a support vector machine for expression classification.

In some exemplary embodiments of the present disclosure, the non-face area removing includes: performing face detection and location onto the video frame de-lighting sequence through a face detector so as to obtain calibration of face key points, and displaying, by using an affine transformation, the calibration of face key points onto a unified predefined template so as to obtain the face video frame sequence.

In some exemplary embodiments of the present disclosure, the head posture impact elimination on facial expression includes: eliminating, by using a spatial transformation network, an impact of head posture on facial expression from the face video frame sequence so as to obtain an expression video frame sequence.

In some exemplary embodiments of the present disclosure, augmentation for the expression video frame sequence adopts data augmentation or generative confrontation network to obtain a video preprocessed frame sequence.

In some exemplary embodiments of the present disclosure, extracting the HOG features that characterize facial appearance and shape features includes: fusing time domain information in the video preprocessed frame sequence by using a histogram of orientation gradients, and extracting facial expression features of a horizontal axis vs. a time axis, facial expression features of a vertical axis vs. the time axis, and facial expression features of the horizontal axis vs. the vertical axis to perform HOG processing and feature vector merging so as to form three-plane HOG features.

In some exemplary embodiments of the present disclosure, extracting the second-order features that describe a face creasing degree includes: extracting, by using covariance matrix pooling, second-order statistic features that describe the face creasing degree from the video preprocessed frame sequence, and further processing the second-order statistic features by using a symmetric positive definite manifold network to obtain the corresponding facial second-order features.

In some exemplary embodiments of the present disclosure, extracting the facial pixel-level deep neural network features includes: processing data of the video preprocessed frame sequence through a deep neural network so that, instead of outputting a standard classification result, feature vectors prior to an activation function are extracted as the facial pixel-level deep neural network features.

The present disclosure further provides an expression recognition device under a natural scene, including: a video segmentation module, a video frame labeled sequence preprocessing module, a video preprocessed frame sequence feature extraction module, a feature fusion module, and an expression classification module, wherein the video segmentation module is connected to the video frame labeled sequence preprocessing module, the video frame labeled sequence preprocessing module is connected to the video preprocessed frame sequence feature extraction module, the video preprocessed frame sequence feature extraction module is connected to the feature fusion module, and the feature fusion module is connected to the expression classification module.

The video segmentation module is configured to convert an input video into a video frame sequence in terms of a specified frame rate, and perform facial expression labeling to obtain a video frame labeled sequence.

The video frame labeled sequence preprocessing module is configured to remove light irradiation, non-face areas, and an impact of head posture on facial expression from the video frame labeled sequence so as to obtain an expression video frame sequence, and augment the expression video frame sequence to obtain a video preprocessed frame sequence.

The video preprocessed frame sequence feature extraction module is configured to, from the video preprocessed frame sequence, extract histogram of orientated gradient (HOG) features which characterize facial appearance and shape features, extract second-order features of a face creasing degree, and extract, by using a deep neural network, facial pixel-level deep neural network features.

The feature fusion module is configured to perform aligning processing and then vector fusion on the HOG features, the second-order features for a face creasing degree and the facial pixel-level deep neural network features collectively so as to obtain facial feature fusion vectors for training.

The expression classification module is configured to input the facial feature fusion vectors into a support vector machine for expression classification.

In some exemplary embodiments of the present disclosure, the video frame labeled sequence preprocessing module includes a light irradiation elimination module, a face detection and location module, a head posture impact elimination module, and a data augmentation module, wherein the light irradiation elimination module is connected to the face detection and location module, the face detection and location module is connected to the head posture impact elimination module, and the head posture impact elimination module is connected to the data augmentation module.

The light irradiation elimination module is configured to eliminate an impact of light irradiation from the video frame labeled sequence through a brightness preservation dynamic histogram equalization method.

The face detection and location module is configured to remove an impact of non-face areas.

The head posture impact elimination module is configured to eliminate, by using a spatial transformation network, an impact of head posture on facial expression from the face video frame sequence.

The data augmentation module is configured to augment data through data augmentation or generative confrontation network.

In some exemplary embodiments of the present disclosure, the video preprocessed frame sequence feature extraction module includes a HOG feature extraction module, a facial second-order feature extraction module, and a deep neural network feature extraction module, wherein output of the video frame labeled sequence preprocessing module is divided into three paths to connect to the HOG feature extraction module, the facial second-order feature extraction module, and the deep neural network feature extraction module, respectively, and wherein the HOG feature extraction module, the facial second-order feature extraction module and the deep neural network feature extraction module are connected to the feature fusion module, respectively.

The HOG feature extraction module is configured to use a histogram of orientation gradients to fuse with time domain information in the video preprocessed frame sequence, and extract facial expression features of a horizontal vs. a time axis, facial expression features of a vertical axis vs. the time axis, and facial expression features of the horizontal axis vs. the vertical axis to perform HOG processing and feature vector merging so as to form three-plane HOG features.

The facial second-order feature extraction module is configured to extract, through covariance matrix pooling, second-order statistic features that describe a face creasing degree from the video preprocessed frame sequence, and further process the obtained corresponding facial second-order features by using a symmetric positive definite manifold network.

The deep neural network feature extraction module is configured to process the video preprocessed frame sequence data through a deep neural network so that, instead of outputting a standard classification result, feature vectors prior to an activation function are extracted as the facial pixel-level deep neural network features.

A specific structure of the deep neural network feature extraction module includes a first convolution unit, a second convolution unit, a random inactivation layer, a first fully connected layer, and a second fully connected layer, wherein the first convolution unit is connected to the second convolution unit, the second convolution unit is connected to the random inactivation layer, the random inactivation layer is connected to the first fully connected layer, and the first fully connected layer is connected to the second fully connected layer; and wherein the second fully connected layer equips no linear rectification function; and wherein the first convolution unit includes a first convolution layer-I, a first rectified linear unit-I, a first convolution layer-II, a first pooling layer, and a first rectified linear unit-II, wherein the first convolution layer-I is connected to the first rectified linear unit-I, the first rectified linear unit-I is connected to the first convolution layer-II, the first convolution layer-II is connected to the first pooling layer, and the first pooling layer is connected to the second rectified linear unit-II.

The second convolution unit includes a second convolution layer-I, a second rectified linear unit-I, a second convolution layer-II, a second pooling layer, and a second rectified linear unit-II, wherein the second convolution layer-I is connected to the second rectified linear unit-I, the second rectified linear unit-I is connected to the second convolution layer-II, the second convolution layer-II is connected to the second pooling layer, and the second pooling layer is connected to the second rectified linear unit-II.

The foregoing technical solutions provided by the embodiments of the present disclosure have the following advantages.

The present disclosure provides an expression recognition method and device under a natural scene. The method is based on a concept of filtering out information irrelevant to facial expressions in the natural scene, and it thus adopts image preprocessing technology to preprocess video frames so as to effectively filter out features that are irrelevant to facial expressions. Firstly, images of input video frames are pre-processed during image preprocessing through technical means, such as dark light enhancement and specular reflection elimination so as to effectively eliminate an impact of irrelevant factors in the natural scene, such as light irradiation. Secondly, from a perspective of emotional continuity, time domain information in context content of the video is used to track facial expressions so that expression features that can much better express a person' emotions are extracted from the video frames, which address, to a certain extent, problems of bad interference to facial expression recognition by the natural scene and insufficient extraction of features among the expression video frames. Again, extracted various expression features are subject to feature fusion so that the facial expressions in the input video frames can be examined in terms of multiple feature dimensions and overall feature vectors that effectively represent the facial expression features are obtain thereby. Finally, a final facial expression recognition result taking account of multiple factors is resulted, which improves the accuracy of facial expression recognition.

BRIEF DESCRIPTION OF THE DRAWINGS

The drawings here are incorporated into the specification and constitute a part of the specification, which illustrate embodiments in accordance with the present disclosure and are applicable to explain the principle of the present disclosure together with the specification.

In order to more clearly describe the technical solutions in the embodiments of the present disclosure or the existing solutions in the art, accompanying drawings needed in the description of the embodiments or the existing solutions will be briefly introduced below. Apparently, for those of ordinary skill in the art, other drawings can be obtained based on these drawings without any inventive labor involved.

DETAILED DESCRIPTION OF THE EMBODIMENTS

In order to make purposes, technical solutions and advantages of the embodiments of the present disclosure more definite, the technical solutions of the embodiments of the present disclosure will be described clearly and completely below in conjunction with accompanying drawings. Apparently, the embodiments described herein merely constitute a portion, rather than the whole, of the embodiments of the present disclosure. On the basis of the embodiments of the present disclosure, all other embodiments obtained by those of ordinary skill without any inventive labor involved should fall within the protection scope of the present disclosure.

Embodiment 1

Figure 1:
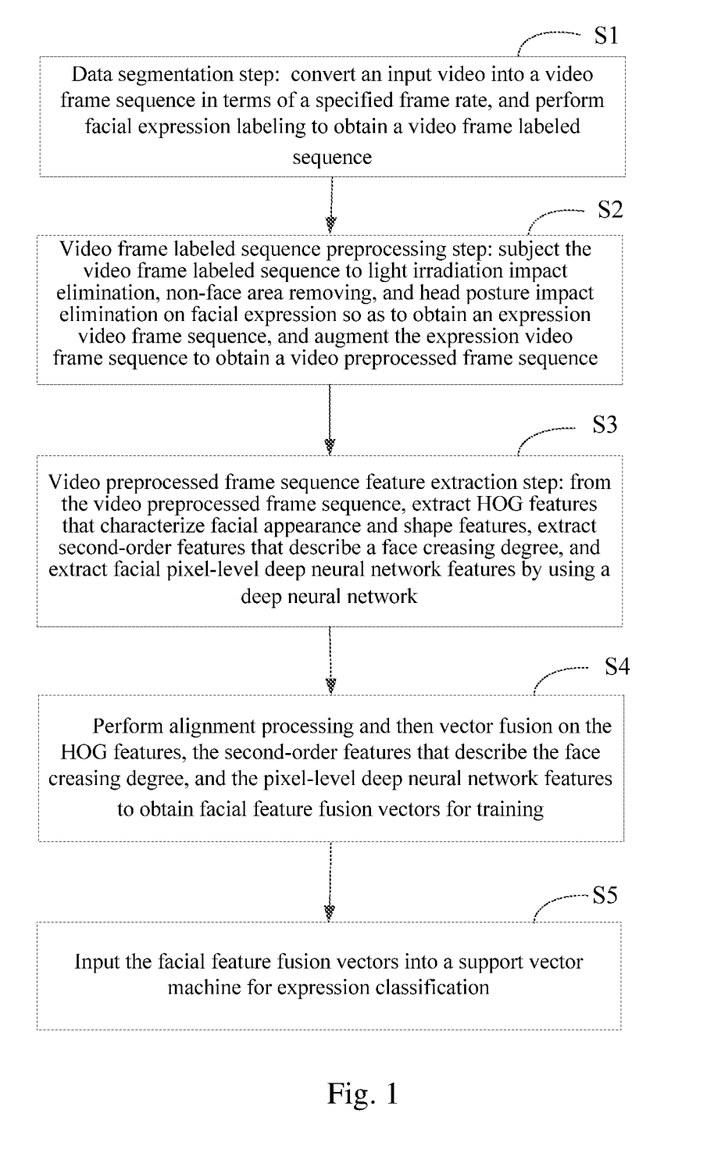
FIG. 1 is a flowchart of an expression recognition method under a natural scene according to an embodiment of the present disclosure.

FIG. 1 is a flowchart of an expression recognition method under a natural scene provided by an embodiment of the present disclosure, including following steps S1 to S5.

S1, data segmentation: an input video is converted into a video frame sequence in terms of a specified frame rate, and the video frame sequence is subject to facial expression labeling to obtain a video frame labeled sequence.

S2, preprocessing of video frame labeled sequence: the video frame labeled sequence is subject to light irradiation impact elimination, non-face area removing, and head posture impact elimination on facial expression so as to obtain an expression video frame sequence. Then, the expression video frame sequence is augmented to obtain a video preprocessed frame sequence. In particular, a specific approach for light irradiation impact elimination is to adopt a brightness preservation dynamic histogram equalization method to eliminate an impact of light irradiation from the video frame labeled sequence so as to obtain a video frame de-lighting sequence.

In some embodiments, an approach for non-face area removing is to perform face detection and location onto the video frame de-lighting sequence through a face detector so as to obtain calibration of face key points, and then to display, by using an affine transformation, the calibration of face key points onto a unified predefined template so as to obtain the face video frame sequence.

In some embodiments, an approach for head posture impact elimination on facial expression is to eliminate, by using a spatial transformation network, an impact of head posture on facial expression from the face video frame sequence so as to obtain an expression video frame sequence.

Augmentation for the expression video frame sequence adopts data augmentation or generative confrontation network to obtain a video preprocessed frame sequence.

S3, feature extraction of video preprocessed frame sequence: from the video preprocessed frame sequence, histogram of orientated gradient (HOG) features that characterize facial appearance and shape features are extracted, second-order features that describe a face creasing degree are extracted, and facial pixel-level deep neural network features are extracted by using a deep neural network.

In some embodiments, a specific approach for extracting the HOG features that characterizes facial appearance and shape features is to fuse time domain information in the video preprocessed frame sequence with the histogram of orientation gradients, and to extract facial expression features of a horizontal axis vs. a time axis, facial expression features of a vertical axis vs. the time axis, and facial expression features of the horizontal axis vs. the vertical axis to perform HOG processing and feature vector merging so as to form three-plane HOG features.

In some embodiments, a specific method for extracting the second-order features that describe a face creasing degree is to extract, by using covariance matrix pooling, second-order statistic features that describe the face creasing degree from the video preprocessed frame sequence, and to further process the second-order statistic features by using a symmetric positive definite manifold network to obtain the corresponding facial second-order features.

In some embodiments, a specific method for extracting the facial pixel-level deep neural network features is to process data of the video preprocessed frame sequence through a deep neural network so that, instead of outputting any standard classification result, feature vectors prior to an activation function are extracted as the facial pixel-level deep neural network features.

S4, the HOG features, the second-order features for describing the face creasing degree, and the pixel-level deep neural network features are subject to alignment processing and then vector fusion so as to obtain facial feature fusion vectors for training.

S5, the facial feature fusion vectors are input into a support vector machine for expression classification.

Figure 3:
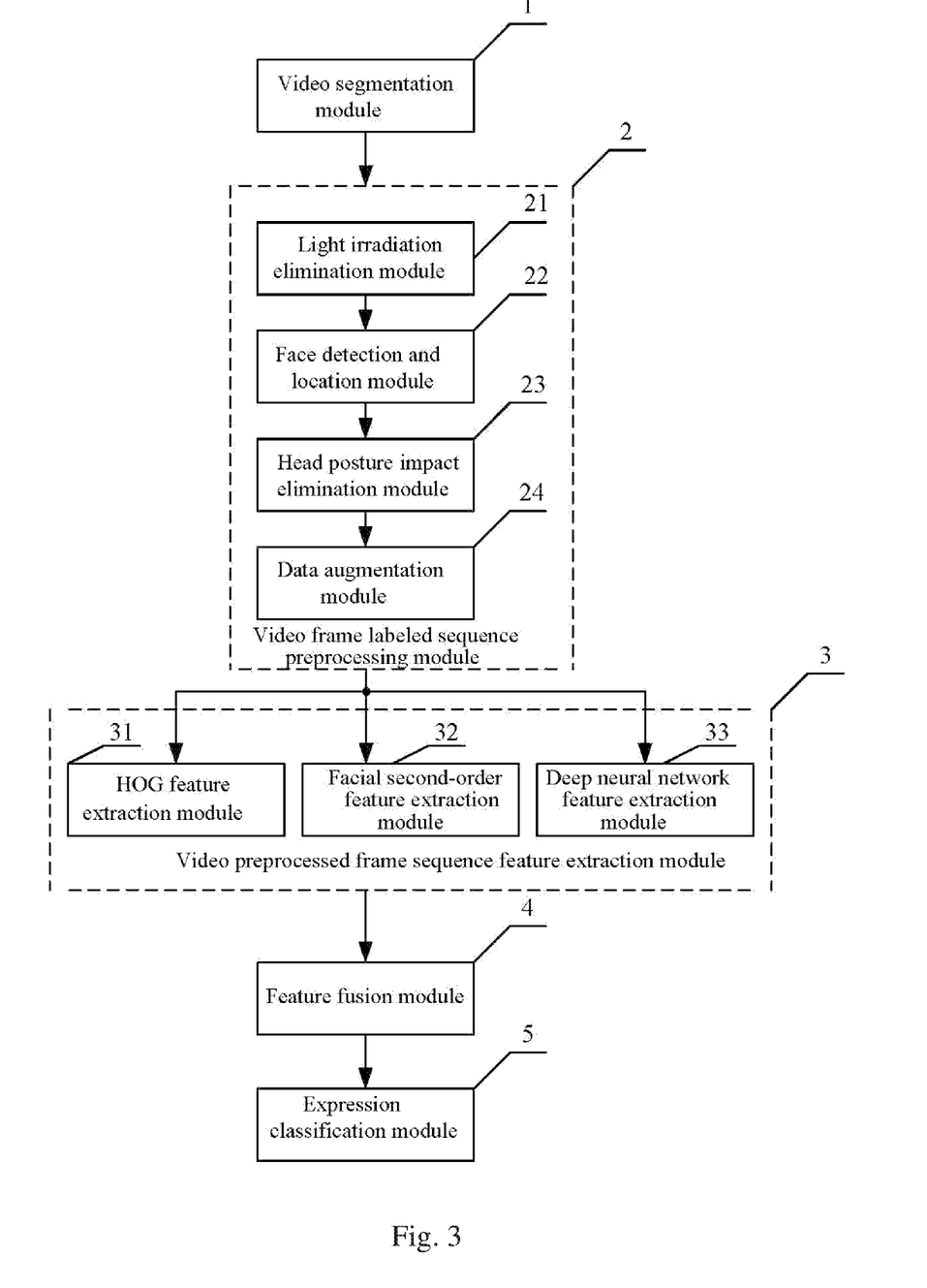
FIG. 3 is a block diagram showing a structure of an expression recognition device under a natural scene according to an exemplary embodiment of the present disclosure.

As shown in FIG. 3, an expression recognition device under a natural scene includes a video segmentation module 1, a video frame labeled sequence preprocessing module 2, a video preprocessed frame sequence feature extraction module 3, a feature fusion module 4, and an expression classification module 5. The video segmentation module 1 is connected to the video frame labeled sequence preprocessing module 2, and the video frame labeled sequence preprocessing module 2 is connected to the video preprocessed frame sequence feature extraction module 3. The video preprocessed frame sequence feature extraction module 3 is connected to the feature fusion module 4, and the feature fusion module 4 is connected to the expression classification module 5.

In some embodiments, the video segmentation module 1 is configured to convert an input video into a video frame sequence in terms of a specified frame rate, and perform facial expression labeling to obtain a video frame labeled sequence.

In some embodiments, the video frame labeled sequence preprocessing module 2 is configured to remove light irradiation, non-face areas, and an impact of head posture on facial expression from the video frame labeled sequence so as to obtain an expression video frame sequence, and then augment the expression video frame sequence to obtain a video preprocessed frame sequence.

In some embodiments, the video preprocessed frame sequence feature extraction module 3 is configured to, from the video preprocessed frame sequence, extract histogram of orientated gradient (HOG) features which characterize facial appearance and shape features, extract second-order features of a face creasing degree, and extract, by using a deep neural network, facial pixel-level deep neural network features.

In some embodiments, the feature fusion module 4 is configured to perform aligning processing and then vector fusion on the HOG features, the second-order features for a face creasing degree and the facial pixel-level deep neural network features collectively so as to obtain facial feature fusion vectors for training.

In some embodiments, the expression classification module 5 is configured to input the facial feature fusion vectors into a support vector machine for expression classification.

In some embodiments, the video frame labeled sequence preprocessing module 2 includes a light irradiation elimination module 21, a face detection and location module 22, a head posture impact elimination module 23, and a data augmentation module 24. The light irradiation elimination module 21 is connected to the face detection and location module 22, the face detection and location module 22 is connected to the head posture impact elimination module 23, and the head posture impact elimination module 23 is connected to the data augmentation module 24.

In some embodiments, the light irradiation elimination module 21 is configured to eliminate an impact of light irradiation from the video frame labeled sequence through a brightness preservation dynamic histogram equalization method.

In some embodiments, the face detection and location module 22 is configured to remove an impact of non-face areas.

In some embodiments, the head posture impact elimination module 23 is configured to eliminate, by using a spatial transformation network, an impact of head posture on facial expression from the face video frame sequence.

In some embodiments, the data augmentation module 24 is configured to augment data through data augmentation or generative confrontation network.

In some embodiments, the video preprocessed frame sequence feature extraction module 3 includes a HOG feature extraction module 31, a facial second-order feature extraction module 32, and a deep neural network feature extraction module 33. Output of the video frame labeled sequence preprocessing module 2 is divided into three paths to connect to the HOG feature extraction module 31, the facial second-order feature extraction module 32, and the deep neural network feature extraction module 33, respectively. The HOG feature extraction module 31, the facial second-order feature extraction module 32 and the deep neural network feature extraction module 33 are connected to the feature fusion module 4, respectively.

In some embodiments, the HOG feature extraction module 31 is configured to use a histogram of orientation gradients to fuse with time domain information in the video preprocessed frame sequence, and extract facial expression features of the horizontal vs. the time axis, facial expression features of the vertical axis vs. the time axis, and facial expression features of the horizontal axis vs. the vertical axis to perform HOG processing and feature vector merging so as to form three-plane HOG features.

In some embodiments, the facial second-order feature extraction module 32 is configured to extract, through covariance matrix pooling, second-order statistic features that describe a face creasing degree from the video preprocessed frame sequence, and further process the obtained corresponding facial second-order features by using a symmetric positive definite manifold network.

In some embodiments, the deep neural network feature extraction module 33 is configured to process the video preprocessed frame sequence data through a deep neural network so that, instead of outputting any standard classification result, feature vectors prior to an activation function are extracted as the facial pixel-level deep neural network features.

Figure 4:
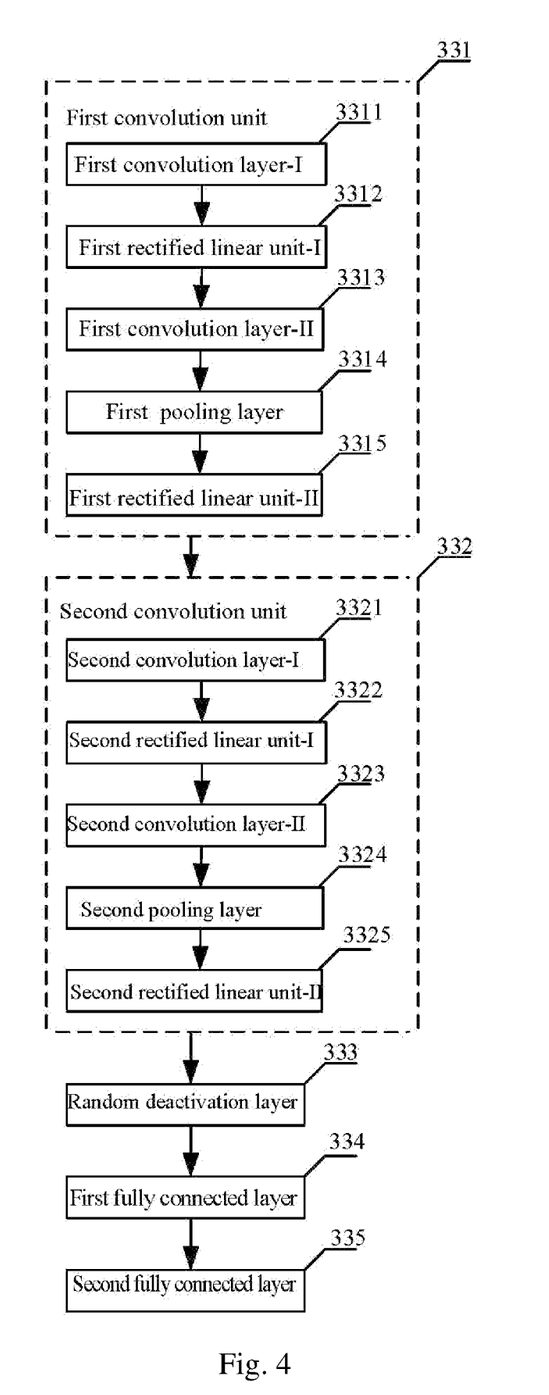
FIG. 4 is a block diagram showing a structure of a deep neural network feature extraction module according to an exemplary embodiment of the present disclosure.

As shown in FIG. 4, a specific structure of the deep neural network feature extraction module 33 includes a first convolution unit 331, a second convolution unit 332, a random inactivation layer 333, a first fully connected layer 334, and a second fully connected layer 335. The first convolution unit 331 is connected to the second convolution unit 332, the second convolution unit 332 is connected to the random inactivation layer 333, the random inactivation layer 333 is connected to the first fully connected layer 334, and the first fully connected layer 334 is connected to the second fully connected layer 335. The second fully connected layer 335 equips no linear rectification function. The first convolution unit 331 includes a first convolution layer-I 3311, a first rectified linear unit-I 3312, a first convolution layer-II 3313, a first pooling layer 3314, and a first rectified linear unit-II 3315. The first convolution layer-I 3311 is connected to the first rectified linear unit-I 3312, the first rectified linear unit-I 3312 is connected to the first convolution layer-II 3313, the first convolution layer-II 3313 is connected to the first pooling layer 3314, and the first pooling layer 3314 is connected to the second rectified linear unit-II 3315.

In some embodiments, the second convolution unit 332 includes a second convolution layer-I 3321, a second rectified linear unit-I 3322, a second convolution layer-II 3323, a second pooling layer 3324, and a second rectified linear unit-II 3325. The second convolution layer-I 3321 is connected to the second rectified linear unit-I 3322, the second rectified linear unit-I 3322 is connected to the second convolution layer-II 3323, the second convolution layer-II 3323 is connected to the second pooling layer 3324, and the second pooling layer 3324 is connected to the second rectified linear unit-II 3325.

Embodiment 2

An expression recognition method under a natural scene provided by Embodiment 2 of the present disclosure includes following steps S1 to S5.

S1, data segmentation: a video file of various formats, such as MP4, MKV, AVI, etc. that is used during training is obtained and decomposed into video frames, and the video frames are save in a form of an image sequence or a program data stream for further processing by other facial expression recognition processes. After the video frames are obtained, a facial expression in each video frame should be labeled for subsequent training.

Specifically, video data for training may be in a type of real-time video stream, network video, or local video. Each of the three types of videos may be used for the training as long as no real-time performance is required. However, since a labeling issue is involved, only the latter two types of videos are generally adopted for the training. This will not be limited hereto in the present disclosure.

In some embodiments, the video frames may be extracted in terms of a specified frame rate from the target video.

In some embodiments, the video frames that correspond to the frame rate may be extracted directly from the video file by using relevant scripts or a video processing software.

In some embodiments, a data set of image-format or video-format facial expression data frames that have been labeled may be used for subsequent processing operations.

Specifically, except for implicit context information contained, a data set of image-format continuous data frames is basically equivalent to a traditional static image facial expression data set in which each frame or a continuous range of frames has/have to be labeled with a specific class to which a facial expression belongs. For a data set of video-format facial expression data frames, a class to which facial expressions in a specific time segment of a video belong should be specified in the unit of frame.

In some embodiments, based on the foregoing, after the labeled video frames are obtained, data preprocessing is started. Problems to be deal with under a natural scene include light irradiation, head posture, facial occlusion, etc.

S2, preprocessing of video frame labeled sequence: an obtained video frame labeled sequence is subject to light irradiation impact elimination, non-face area removing, and head posture impact elimination on facial expression to obtain an expression video frame sequence. Then, the expression video frame sequence is augmented to obtain a video preprocessed frame sequence. In particular, a specific approach for light irradiation impact elimination is to adopt a brightness preservation dynamic histogram equalization method to eliminate an impact of light irradiation from the video frame labeled sequence so as to obtain a video frame de-lighting sequence.

First, a one-dimensional Gaussian filter is used to process a histogram of an image. The Gaussian filter is defined by a formula below, $$f_z = \frac{-z^2}{e2\sigma^2},$$

where z is a coordinate relative to a center of a kernel, and σ is the standard deviation.

Then, a location of a local maximum is detected in a smoothed histogram, based on which various sub-histograms are divided. m0, m1, . . . , mi, . . . , mn are set to be (n+1) gray levels which correspond to the detected local maximum. If the original histogram before smoothing is in a range of [Imin, Imax], then the first sub-histogram is in a range of [Imin, m0], the second sub-histogram is in a range of [m0, m1], the i-th sub-histogram is in a range of [m(i−2), m(i−1)], and so on until the last sub-histogram is in a range of [mn, Imax]. Then, an output result of the i-th sub-histogram is calculated according to the following formulas, $$span_i = high_i - low_i$$

$$factor_i = span_i * \log_{10} M$$

$$range_i = \frac{(L-1)*factor_i}{\sum_{j=1}^{n} span_j * \log_{10} M},$$

where $high_i$ is the highest intensity value contained in the sub-histogram i in an input image, $low_i$ is the lowest intensity value contained in the sub-histogram i in the input image, M is the total pixels contained in this partition; L represents a span of the gray levels. A dynamic range of the sub-histogram i in the input image is given as $span_i$, and a dynamic range of the sub-histogram i in an output image is given as $range_i$.

A range of the sub-histogram i in the output image is set to [$start_i$, $end_i$]. If the first sub-histogram of the output image is set to be in a range of [0, range1], then $start_i$ and $end_i$ (i>1) may be calculated as below:

$$start_i = \sum_{k=1}^{i-1} range_k + 1$$

$$end_i = \sum_{k=1}^{i} range_k$$

Then, each partition is subject to equalization independently. For the sub-histogram i with the range of [$start_i$, $end_i$], equalization of this partition follows the following formula, $$y(x) = start_i + (end_i - start_i) * \sum_{k=start_i}^{x} \frac{nk}{M},$$

where nk is the number of pixels with a brightness of k, and M is the total number of pixels contained in this partition.

Finally, an average brightness $M_i$ of the input is calculated, and an average brightness g(x,y) of the output after equalization $M_0$ is obtained. In order to recover the average brightness of the output back to the average brightness of the input, operate as below:

$$g(x, y) = \frac{M_i}{M_0} f(x, y),$$

where g(x,y) is a final output image, and f(x,y) is an output after the equalization process. This normalization will ensure that an average output intensity will be almost equal to an average input intensity.

In some embodiments, for a situation where the light irradiation effect is too strong, a convolutional neural network is used to process video frames having specular reflection, and a loss function is expressed as:

$$E = \sum_{i=1}^{N} \|(y^i - x^i) - f(x^i)\|^2,$$

where $x^i$ represents an input image having specular reflection, $y^i$ represents a corresponding diffuse image, $y^i - x^i$ represents a residual of these two, $f(x^i)$ is an output of the convolutional neural network, which optimizes parameters of the network while guaranteeing a loss function E as little as possible.

In some embodiments, in the process of the preprocessing, processing for light irradiation impact may be substituted by a feature extraction method that is not sensitive to light. For example, a local binary pattern (LBP) and its improved version or Haar may be taken as features to be extracted, but some important information in the video frames might be omitted thereby, which won't be explained any further here.

In some embodiments, a method for removing non-face areas is to perform face detection and location onto the video frame de-lighting sequence through a face detector, and to cut, after a face bounding box is obtained, a face area out of an input image. After face detection, key points of a face may be calibrated to further improve the effect of facial expression recognition. According to coordinates of the key points, the face key points may be displayed, by using an affine transformation, onto a unified predefined template. This step can reduce change and impact resulted from rotation and facial deformation.

In some embodiments, the most commonly used face calibration method is IntraFace, which adopts cascaded face key point positioning, i.e., SDM, to accurately predict 49 face key points.

In some embodiments, in a natural scene, multiple face detectors can be used in combination for complementarity so as to perform better face alignment.

In some embodiments, considering that a face in the video frames under the natural scene may need spatial operations, such as zooming out, translation, and rotation, it is thus desired that a model generated during the training can have spatial invariance. That is, while input data has undergone some transformation, the model can still have the same correct result.

Figure 2:
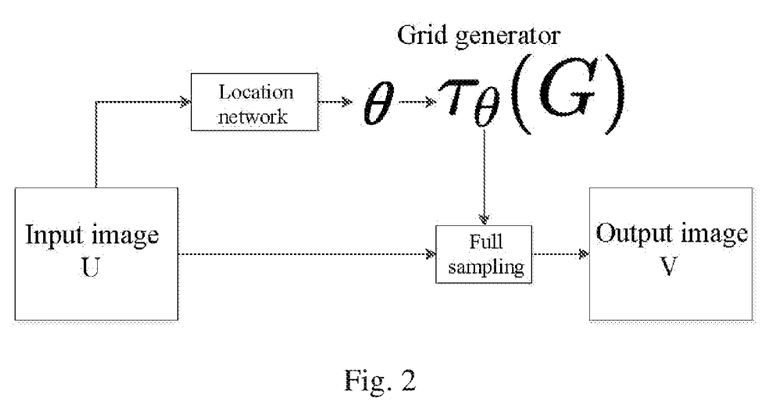
FIG. 2 is a schematic diagram showing a structure of a spatial transformation network according to an exemplary embodiment of the present disclosure.

In some embodiments, the method for eliminating an impact of head posture on facial expression is to eliminate, by using a spatial transformation network, an impact of head posture on the facial expression from the face video frame sequence so as to obtain an expression video frame sequence.

In some embodiments, as shown in FIG. 2, input of the spatial transformer network (STN) is U, and output is V, and a middle layer—feature map that is input may be of multi-channel. The STN is mainly divided into the following three steps:

Step 1—Localisation net: a localisation net is a self-defined network, which is input with U and outputs change parameters θ which are configured to map a relationship of coordinates between U and V:

$$\begin{bmatrix} x' \\ y' \end{bmatrix} = \begin{bmatrix} a & b \\ c & d \end{bmatrix}\begin{bmatrix} x \\ y \end{bmatrix} + \begin{bmatrix} e \\ f \end{bmatrix}.$$

where θ={a, b, c, d, e, f} represents the change parameters, which six variables are configured to map the relationship of coordinates between an input image and an output image.

Step 2—Grid generator: when the change parameters have been obtained in the first step, a matrix operation is performed in this step. The matrix operation is performed by taking all coordinates of the output image V as independent variables and taking θ as parameters to obtain coordinates in the input image U:

$$\begin{pmatrix} x_i^s \\ y_i^s \end{pmatrix} = \theta \begin{pmatrix} x_i^t \\ y_i^t \\ 1 \end{pmatrix} = \begin{bmatrix} \theta_{11} & \theta_{12} & \theta_{13} \\ \theta_{21} & \theta_{22} & \theta_{23} \end{bmatrix}\begin{pmatrix} x_i^t \\ y_i^t \\ 1 \end{pmatrix},$$

where $(x_i^s, y_i^s)$ is recorded as the i-th coordinate in the input image U, and $(x_i^t, y_i^t)$ is recorded as the i-th coordinate in the output image V, where said i is related to V and means that the i-th coordinate in V is mapped to a coordinate in U, and i has nothing to do with U.

In some embodiments, a length and a width of V can be customized without keeping consistent with U.

Step 3—Sampler: since each coordinate in V has been related to a coordinate in U through calculation in Step 2, in this step, a pixel value of a related coordinate in U can be directly obtained for filling according to the coordinate in V without any matrix operation. It should be noted that the filling does not mean direct filling because, firstly, the calculated coordinate may be a decimal which needs further processing, secondly, other surrounding pixel values generally should be considered during the filling. A formula for filling is, $$V_i = \sum_n \sum_m U_{nm} * \max(0, 1 - |x_i^s - m|) * \max(0, 1 - |y_i^s - m|),$$

where n and m indicate all coordinates traversed all over the input image U, $U_{nm}$ refers to a pixel value of a certain coordinate in the input image U, and a bilinear interpolation is adopted here.

In some embodiments, though the above Step 1 to Step 3, the output image V produced from the input image U can be obtained.

In some embodiments, the steps of STN can also be inserted inside the convolutional neural network, so the input of the STN can also be the feature map of the middle layer of the convolutional neural network.

Augmentation includes two patterns, i.e., online augment and offline augment. During training, both the online or offline augments may be used, but in usage, only the online augment can be used.

Augmentation for the expression video frame sequence adopts data augmentation or generative confrontation network to obtain a video preprocessed frame sequence.

Based on the foregoing, the video frames are randomly cropped, and then flipped horizontally, shifted, etc. in terms of geometry, and operations, such as changing image chromatic aberration, color dithering, distorting image feature, and increasing image noise are performed in terms of pixel transformation. In this way, a data set that is nearly 10 times larger than its original data set can be obtained. Further, the data set should be as diverse as possible so that a model to be trained has stronger generalization ability.

In some embodiments, a method for offline augment includes random perturbation and transformation, by means of which an image can be rotated, shifted, skewed, zoomed, de-noised, contrast adjusted, color dithered, and so on. At the same time, these operations can also be combined to make the trained model more robust to faces in abnormal states, such as in deviation and rotation.

In some embodiments, in addition to an image augmentation approach using data augmentation, Generative Adversarial Networks (GAN) may be also adopted to generate more training data.

Based on the foregoing, a video is firstly cropped into video frames, then the video frames are subject to image processing and other related technologies to address, to a certain extent, interference such as light irradiation and head posture in the video frames in a natural environment. Next, the number of the original data frames is increased through the data augmentation technology to enrich sample classes of facial expression in the video frames so that a model generated during the training is more robust.

S3, feature extraction of video preprocessed frame sequence: from the video preprocessed frame sequence, histogram of orientated gradient (HOG) features that characterize facial appearance and shape features are extracted, second-order features that describe a face creasing degree are extracted, and facial pixel-level deep neural network features are extracted by using a deep neural network.

In a specific example of the present disclosure, based on the foregoing, considering that appearance and shape of a local object can usually be well characterized by a local intensity gradient or a distribution of edge direction, and that facial expression is caused by facial muscle movement, Histogram of Oriented Gradients (HOG) is used, but merely limited to processing of static images, to effectively capture and represent these deformations. For data of the video frames, context information should be fused therewith.

In some embodiments, a specific method for extracting the HOG features that characterizes facial appearance and shape features is to fuse time domain information in the video preprocessed frame sequence by using the histogram of orientation gradients, and to extract facial expression features of the horizontal axis vs. the time axis, facial expression features of the vertical axis vs. the time axis, and facial expression features of the horizontal axis vs. the vertical axis to perform HOG processing and feature vector merging so as to form three-plane HOG features.

In some embodiments, taking a plane composed of the horizontal axis and the vertical axis as an example, for a video frame image of 128*128 pixels, it is divided into pixel blocks of 8*8 pixels. For each pixel block cell, a histogram is created. Firstly, directions of gradients of all pixels in each cell are grouped into a specific number of direction (angle) boxes, and gradient magnitudes of the gradients in each angle box are summed. The number of boxes in a histogram is a free parameter, generally set to 9 angle boxes. Then, every pixel in each pixel block cell is traversed, and sorted into an angle box according to intensity and direction of its gradient. Finally, a feature vector representing a HOG descriptor of each pixel block cell is obtained. For a video frame image with a size of 128*128 pixels, 16*16=256 sets of HOG vectors can be obtained, and the HOG vectors are spliced into one feature vector representing the HOG descriptor of the image.

In some embodiments, a traditional convolutional neural network captures only first-order statistics through convolution layers, maximums or average pooling, and fully connected layers. Some second-order statistics are better regional descriptors than the first-order statistics. Although a rectified linear unit (ReLU) activation function introduces non-linear operation, it can only operate at a very low level of pixels. As such, it is considered to capture second-order information in the data of video frames.

In some embodiments, a specific method for extracting the second-order features that describe a face creasing degree is to extract, by using covariance matrix pooling, second-order statistic features that describe the face creasing degree from the video preprocessed frame sequence, and to further process the second-order statistical features by using a symmetric positive definite manifold network to obtain the corresponding facial second-order features.

In some embodiments, after a given set of video frame data is delivered to the convolutional neural network, a set of feature vectors output from a fully connected layer is calculated to obtain a covariance matrix, a calculation formula of which is, $$C = \frac{1}{n-1} \sum_{i=1}^{n} (f_i - \bar{f})(f_i - \bar{f})^T,$$

where $f_i$ represents a single feature vector, $f_1, f_2, \ldots, f_n \in R^d$, and $\bar{f}$ represents an average of all feature vectors.

The covariance matrix obtained as such is symmetric and positive only when the number of linear independent components of the current feature vector is greater than or equal to the dimension of the current feature vector d, otherwise it is necessary to add matrix traces to the diagonals of the resulted matrix for regularization, a formula for this is, $$C^+ = C + \lambda \text{trace}(C)I,$$

where $\lambda$ is a regularization parameter, and I is an identity matrix.

The covariance matrix obtained as such is usually located on Riemannian manifold of a matrix of unit circle, for which direct flattening and application will directly lead to loss of geometric information. A standard method applies a logarithmic operation to flatten the Riemannian manifold structure so that a standard loss function of Euclidean space can be applied. The covariance matrix obtained as such is generally very large, so its dimensionality needs to be reduced without losing any geometric structure. A logarithmic flattening formula is, $$X_k = f_l^k(x_{k-1}) = \log(x_{k-1}) = x_{k-1} \log(\Sigma_{k-1}) U_{k-1}^T,$$

where $X_k = x_{k-1} \log(\Sigma_{k-1}) U_{k-1}^T$ represents singular value decomposition, and log( ) represents a vectorized logarithmic operation onto the matrix.

In some embodiments, a specific method for extracting the facial pixel-level deep neural network features is to process data of the video preprocessed frame sequence through a deep neural network so that, instead of outputting any standard classification result, feature vectors prior to an activation function are extracted as the facial pixel-level deep neural network features.

S4, the HOG features, the second-order features for the face creasing degree, and the pixel-level deep neural network features are subject to alignment processing and then vector fusion so as to obtain facial feature fusion vectors for training. If necessary, normalization may be performed to certain extent prior to the fusion.

S5, the facial feature fusion vectors are input into a support vector machine for expression classification, so that each feature vector is labeled with one of various emotion classes. Using multiple cross-validation, a single-to-multiple linear support vector machine (SVM) is trained for classification through grid searching.

In some embodiments, facial emotion classes may be divided into two types, i.e., discrete and dimensional. Discrete emotions include anger, disgust, fear, happiness, sadness, and surprise.

During a test, coding features are calculated in the same manner and a SVM class-prediction is used as a submitted outcome.

It should be noted that, in this document, relational terms such as "first" and "second" are merely used to distinguish one entity or operation from another entity or operation, and do not intent to require or imply any such actual relationship or sequence between these entities or operations. Moreover, wordings "include", "comprise" or any other variants thereof are intended to cover non-exclusive inclusion, so that a process, method, article or device including a series of elements not only includes those elements, but also include other elements that have not been listed definitely or elements inherent to the process, method, article, or device. Except that there is further limitation, an element defined by the wordings, such as "include a . . . " does not exclude existence of other identical elements included in the process, method, article, or device including said element.

These above are only specific embodiments of the present disclosure to facilitate understanding or implementation of the present disclosure by those skilled in the art. Various modifications to these embodiments will be apparent to those skilled in the art, and the general principles defined herein can be implemented in other embodiments without departing from the spirit or scope of the present disclosure. Therefore, the present disclosure will not be limited to the embodiments illustrated in this document, but should conform to the broadest scope consistent with the principles and novel features provided in this document.

What is claimed is:

1. An expression recognition method under a natural scene, comprising:
    S1, data segmentation step, in which an input video is converted into a video frame sequence in terms of a specified frame rate, and the video frame sequence is subject to facial expression labeling so as to obtain a video frame labeled sequence;
    S2, video frame labeled sequence preprocessing step, in which the video frame labeled sequence is subject to light irradiation impact elimination, non-face area removing, and head posture impact elimination on facial expression so as to obtain an expression video frame sequence, and the expression video frame sequence is augmented to obtain a video preprocessed frame sequence, wherein the light irradiation impact elimination comprises adopting a brightness preservation dynamic histogram equalization method to eliminate an impact of light irradiation from the video frame labeled sequence so as to obtain a video frame de-lighting sequence;
    S3, video preprocessed frame sequence feature extraction step, in which, from the video preprocessed frame sequence, histogram of orientated gradient (HOG) features that characterize facial appearance and shape features are extracted, second-order features that describe a face creasing degree are extracted, and facial pixel-level deep neural network features are extracted by using a deep neural network;
    S4, performing alignment processing and then vector fusion on the HOG features, the second-order features that describe the face creasing degree, and the pixel-level deep neural network features so as to obtain facial feature fusion vectors for training; and
    S5, inputting the facial feature fusion vectors into a support vector machine for expression classification,
wherein in the step S3, the HOG features that characterize facial appearance and shape features being extracted comprises: fusing time domain information in the video preprocessed frame sequence by using a histogram of orientated gradients, and extracting facial expression features of a horizontal axis vs. a time axis, facial expression features of a vertical axis vs. the time axis, and facial expression features of the horizontal axis vs. the vertical axis to perform HOG processing and feature vector merging so as to form three-plane HOG features.

2. The method according to claim 1, wherein the non-face area removing includes: performing face detection and location onto the video frame de-lighting sequence by using a face detector to obtain calibration of face key points, and displaying, by using an affine transformation, the calibration of face key points onto a unified predefined template so as to obtain a face video frame sequence.

3. The method according to claim 2, wherein the head posture impact elimination on facial expression includes: eliminating, by using a spatial transformation network, an impact of head posture on facial expression from the face video frame sequence so as to obtain the expression video frame sequence.

4. The method according to claim 3, wherein augmentation for the expression video frame sequence uses data augmentation or generative confrontation network to obtain a video preprocessed frame sequence.

5. The method according to claim 1, wherein the second-order features that describe a face creasing degree being extracted includes: extracting, by using covariance matrix pooling, second-order statistic features that describe the face creasing degree from the video preprocessed frame sequence, and further processing the second-order statistic features by using a symmetric positive definite manifold network to obtain the corresponding facial second-order features.

6. The method according to claim 1, wherein the facial pixel-level deep neural network features being extracted includes: processing data of the video preprocessed frame sequence through a deep neural network so that, instead of outputting a standard classification result, feature vectors prior to an activation function are extracted as the facial pixel-level deep neural network features.

* * * * *